United States Patent Office.

LEON CLINE, OF CHICAGO, ILLINOIS, ASSIGNOR OF ONE-FOURTH TO SAMUEL W. CLINE, OF SAME PLACE.

COMPOSITION FUEL.

SPECIFICATION forming part of Letters Patent No. 330,000, dated November 10, 1885.

Application filed September 1, 1885. Serial No. 175,951. (No specimens.)

*To all whom it may concern:*

Be it known that I, LEON CLINE, a citizen of the United States, and a resident of Chicago, county of Cook, and State of Illinois, have invented a new and useful Composition Fuel, of which the following is a specification.

The purpose of the present invention is to provide a slow-consuming fuel which will give only a mild and safe heat for warming feet and other like purposes, and to be burned in a suitable portable heating-case, and also to provide a fuel with which a disinfecting article can be combined to fumigate apartments.

The nature of the invention is as follows: I take three parts, by measure, of charcoal, finely broken, and add thereto one part of finely-cut cork chips, mixing them thoroughly, and put the compound in a dry condition, when it is ready for use.

For feet-warming I put one quart of the fuel into an iron pan, which is preferably oblong and with square angles, and place the pan in an exterior case, which has air-ports in its sides on about a level with the top of the pan, which may come to within a half-inch of the cover to the case, and in the said cover are formed openings for the escape of heat and the aroma of the fumigating material to enter the compartment.

The best means for firing the fuel is to take a lump of lighted charcoal and put it on top thereof, and use a small blow to keep the coal alive till composition is thoroughly ignited. After this the coal can be removed, and there will be no further attention required except to stir it from time to time to bring fresh fuel to the surface, the necessity for which will be understood when it is known that the fuel burns slowly from the top, emitting no unpleasant smell.

The composition can be used in a room safely, there being but a trifle—a pint of powdered charcoal—consumed in six hours.

The gist of the invention is the cork, which prevents the charcoal from burning so rapidly as it would in its natural state, and so far as my numerous experiments demonstrate there is nothing but the cork which will serve this purpose.

The fuel for the purpose is very cheap, producing no flame or sparks, and it is proved to be perfectly safe and to give a longer heat than other material which can be so employed.

Nearly all dry herbs, roots, and many dry chemicals can be used in small quantities sufficient for fumigating purposes with the fuel.

I claim—

An article of composition fuel composed of fine charcoal mixed with fine-cut cork in substantially the proportions stated, and for the purposes set forth.

LEON CLINE.

Witnesses:
G. L. CHAPIN,
S. W. CLINE.